(12) United States Patent
Ogawa et al.

(10) Patent No.: US 8,409,438 B2
(45) Date of Patent: Apr. 2, 2013

(54) APPARATUS AND METHOD FOR TREATING RADIOACTIVE NITRATE WASTE LIQUID

(75) Inventors: Naoki Ogawa, Hyogo (JP); Katsushi Shibata, Hyogo (JP); Osamu Kohanawa, Hyogo (JP); Kazuhiko Kuroda, Tokyo (JP); Hiromitsu Nagayasu, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 409 days.

(21) Appl. No.: 12/743,319

(22) PCT Filed: Feb. 6, 2009

(86) PCT No.: PCT/JP2009/052096
§ 371 (c)(1),
(2), (4) Date: May 17, 2010

(87) PCT Pub. No.: WO2009/099208
PCT Pub. Date: Aug. 13, 2009

(65) Prior Publication Data
US 2010/0258500 A1 Oct. 14, 2010

(30) Foreign Application Priority Data

Feb. 8, 2008 (JP) .................................. 2008-029555

(51) Int. Cl.
*C02F 3/28* (2006.01)
*G21F 9/18* (2006.01)
(52) U.S. Cl. ........ 210/603; 210/605; 210/610; 210/631; 210/259; 210/903; 435/262.5; 588/20
(58) Field of Classification Search .................. 210/603, 210/605, 610, 611, 630, 631, 252, 259, 903; 435/262, 262.5; 588/20
See application file for complete search history.

(56) References Cited

U.S. PATENT DOCUMENTS

| 5,948,259 A | 9/1999 | Deguitre et al. |
| 2003/0062306 A1 | 4/2003 | Perriello |

(Continued)

FOREIGN PATENT DOCUMENTS

| DE | 195 29 021 C1 | 2/1997 |
| JP | 7-13497 U | 3/1995 |

(Continued)

OTHER PUBLICATIONS

N. Ogawa et al, "Development of Bio-Treatment of High Concentration Sodium Nitrate Waste", 2006 Fall Meeting of the Atomic Energy Society of Japan, Aug. 17, 2006, A24, cited in ISR.

(Continued)

*Primary Examiner* — Fred Prince
(74) *Attorney, Agent, or Firm* — Westerman, Hattori, Daniels & Adrian, LLP

(57) ABSTRACT

To provide an apparatus for treating a radioactive nitrate waste liquid that includes a denitrification tank (12A) which accommodates active sludge that adsorbs or takes in the radioactive substance in a nitrate waste liquid (11) and in which an anaerobic microorganism that reduces the nitrate to nitrogen gas grows, and a reaeration tank (14) in which a denitrification-treated liquid (24) treated in the denitrification tank (12A) is aerated and mixed with active sludge. A pH adjuster (21), a carbon source (22), and nitrogen gas are supplied to the denitrification tank (12A) so as to separate a denitrified liquid into a solid content and the denitrification-treated liquid (24) by using a first solid-liquid separating film (25), and the denitrification-treated liquid (24) treated with the active sludge in the reaeration tank (14) is reaerated and separated into a solid content and a reaeration-treated liquid (27) by using a second solid-liquid separating film (28).

11 Claims, 11 Drawing Sheets

U.S. PATENT DOCUMENTS

| | | |
|---|---|---|
| 2003/0136735 A1* | 7/2003 | Perriello .................. 210/610 |
| 2006/0249449 A1 | 11/2006 | Nakhla et al. |
| 2008/0179241 A1 | 7/2008 | Rhee et al. |

FOREIGN PATENT DOCUMENTS

| | | | |
|---|---|---|---|
| JP | 11-156392 A | 6/1999 | |
| JP | 3150506 B2 | 3/2001 | |
| JP | 3697037 B2 | 9/2005 | |
| JP | 2006-136853 A | 6/2006 | |
| JP | 2006-297374 A | 11/2006 | |
| JP | 2007-105627 A | 4/2007 | |
| JP | 2008-12483 A | 1/2008 | |
| JP | 4358652 B2 | 11/2009 | |
| KR | 10-0722929 B1 | 5/2007 | |
| WO | 2007/055440 A1 | 5/2007 | |
| WO | 2010/041041 A1 | 4/2010 | |

OTHER PUBLICATIONS

International Search Report of PCT/JP2009/052096, mailing date of Mar. 10, 2009.

Extended European Search Report dated Jun. 4, 2012, issued in corresponding European Patent Application No. 09708931.2 (8 pages).

* cited by examiner

APPARATUS AND METHOD FOR TREATING RADIOACTIVE NITRATE WASTE LIQUID

TECHNICAL FIELD

The present invention relates to an apparatus and a method for treating a radioactive nitrate waste liquid capable of reducing nitrate contained in waste water.

BACKGROUND ART

A nitrate waste liquid generated from nuclear facilities such as a reprocessing plant has high concentration (salt concentration of equal to or more than 1%) as well as being radioactive. Therefore, the nitrate waste liquid cannot be discharged as it is, and is finally cast into a cement-solidified form and disposed underground.

In recent years, there has been a concern that when the cement-solidified form contains nitrate, the nitrate may leak and pollute surrounding ground water and soil environment and thus dissolution of the nitrate is studied.

There are various methods for treating nitrate such as an electric reduction method, a chemical reduction method, and a biological reduction method. The electric reduction method has problems such as inhibition by heavy metals and generation of ammonia.

Besides, the chemical reduction method has problems such as exothermic reaction and generation of ammonia.

On the other hand, the biological reduction method allows treatment at an ordinary temperature and pressure and there is no generation of ammonia. Accordingly, the method of treating nitrate by using the biological treatment has been studied (Patent Document 1). However, in the method of Patent Document 1, only one type of carbon source is used, so the method has problems such that the amount of redundant sludge generated with the nitrate reduction treatment is increased and a secondary waste disposal expense is increased.

FIG. 11 is a schematic diagram of a configuration of a conventional apparatus for treating a radioactive nitrate waste liquid utilizing an organism.

As shown in FIG. 11, a conventional apparatus 100 for treating a radioactive nitrate waste liquid includes a denitrification tank 102 that reduces nitrate, which is present in a nitrate waste liquid 101 generated from nuclear facilities (not shown), to nitrogen gas, a reaeration tank 104 that aerates and mixes a denitrified liquid 103 obtained by denitrification with active sludge, and a precipitation tank 108 that separates a reaerated liquid 105 that is a denitrification-treated liquid discharged from the reaeration tank 104 into precipitated sludge 106 and a treated liquid 107.

The denitrification tank 102 includes active sludge containing a large amount of denitrifying bacteria (not shown). In the denitrification tank 102, nitrate ions in a nitrate waste liquid are reduced to nitrogen gas ($N_2$) according to a reaction based on the following formula (1) by an action of an anaerobic microorganism (denitrifying bacteria) and is reduced from the nitrate waste liquid.

At this time, a carbon source 121 such as methanol and a pH adjuster 120 are supplied to the denitrification tank 102. Further, a mixer 110 is used to mix inside the denitrification tank 102.

$$NO_3^- + 5/6 CH_3OH \rightarrow 1/2 N_2 + 5/6 CO_2 + 7/6 H_2O + OH^- \quad (1)$$

Thereafter, the reaerated liquid 105 passes through the precipitation tank 108 from the reaeration tank 104, and is sent as a treated liquid 107 to a subsequent process (not shown). The sludge 106 precipitated in the precipitation tank 108 is recovered as redundant sludge 131 by a circulating pump 111. Further, a part of the sludge 106 precipitated in the precipitation tank 108 is returned to the denitrification tank 102 via a returned-sludge supplying line 112 and is reused. The sludge not reused is removed from a system as the redundant sludge 131 and is sent to a disposing process (not shown).

Further, there is used a method and an apparatus for treating a nitrate-containing waste liquid. The method includes a microbial treatment process of reducing nitrate nitrogen and nitrite nitrogen to nitrogen by using anaerobic denitrifying bacteria in microorganism-containing sludge, and the apparatus includes a plurality of treatment tanks (Patent Document 2).

Patent Document 1: Japanese Patent No. 3697037
Patent Document 2: Japanese Patent Application Laid-open No. 2007-105627

DISCLOSURE OF INVENTION

Problem to be Solved by the Invention

However, in the conventional apparatus 100 for treating a radioactive nitrate waste liquid, when the concentration of nitrate in the nitrate waste liquid 101 is low (salt concentration is less than 1%), the denitrifying bacteria is not perished; however, when the concentration of nitrate in the nitrate waste liquid 101 is high (for example, about 1 to 7%), there is a problem that the denitrifying bacteria may be perished due to a rise in pH with the biological denitrification reaction.

Further, there is also the following problem. That is, when the concentration of nitrate in the nitrate waste liquid 101 is high (for example, about 1 to 7%), water seeps from a living organism due to a rise in an osmotic pressure, its biology cannot be maintained and the living organism is perished. Therefore, a minute sludge flock is generated and the sludge 106 does not precipitate in the precipitation tank 108, resulting in the sludge 106 flowing backwards with the treated liquid 107.

Still another problem is that, when the carbon source 121 supplied in the denitrification tank 102 (for example, organic acid such as acetic acid or sweetener) is changed, there occurs a multiplication of microorganisms, an increase in the generated amount of redundant sludge 131, and an increase in the amount of disposal.

There is also a problem for nuclear facilities that the increased generated amount of the redundant sludge 131 leads to huge expenses for disposal, because a secondary waste is disposed underground as a solidified form. That is, there is a problem that the amount of the secondary waste needs to be decreased.

Facilities that treat a radioactive nitrate waste liquid need to be installed within a controlled area for radiation, and thus there is a demand for making the treatment facilities compact.

In addition, there is a demand that the amount of secondary waste needs to be reduced.

Furthermore, as a microbial treatment system to be installed within a controlled area for radiation, there is a demand that it is needed to stabilize reactions and performances.

In view of the above problems, an object of the present invention is to provide a method and an apparatus for treating a radioactive nitrate waste liquid capable of efficiently microbially treating a waste liquid having a high nitrate concentration, and the apparatus can be installed within a controlled area for radiation.

Means for Solving Problem

According to an aspect of the present invention, an apparatus for treating a radioactive nitrate waste liquid, includes: a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; and a reaeration tank that aerates and mixes a denitrification-treated liquid treated in the denitrification tank with active sludge in which the aerobic microorganism grows. The denitrification tank includes: a pH adjusting unit that supplies a pH adjuster used for adjusting pH of the nitrate waste liquid; a carbon-source supplying unit that supplies a carbon source to the denitrification tank; a first solid-liquid separating unit that separates a denitrified liquid treated with the active sludge into a sludge-containing solid content and a denitrification-treated liquid; and a gas supplying unit that is arranged on a lower side of the first solid-liquid separating unit and supplies gas not containing oxygen into the denitrification tank. The reaeration tank includes: a second solid-liquid separating unit that further separates the denitrification-treated liquid treated with the active sludge into a sludge-containing solid content and a treated liquid; and an air supplying unit that is arranged on a lower side of the second solid-liquid separating unit and supplies air into the reaeration tank.

Advantageously, in the apparatus for treating a radioactive nitrate waste liquid, pH of the denitrified liquid in the denitrification tank is from 7.0 to 10.0.

Advantageously, in the apparatus for treating a radioactive nitrate waste liquid, the denitrification tank includes a gas circulating line through which nitrogen gas and carbon dioxide gas produced by a reaction between the anaerobic microorganism and the nitrate in the denitrified liquid are circulated into the denitrification tank.

Advantageously, the apparatus for treating a radioactive nitrate waste liquid, further includes: a pH sensor that measures pH of the denitrified liquid; and a carbon-dioxide-gas supply-amount adjusting valve that adjusts an amount of carbon dioxide gas supplied to the denitrification tank.

Advantageously, in the apparatus for treating a radioactive nitrate waste liquid, a carbon source supplied to the denitrification tank is acetic acid, and the apparatus further includes: a pH sensor that measures pH of the denitrified liquid; and a carbon-source supply-amount adjusting valve that adjusts an amount of a carbon source supplied to the denitrification tank.

Advantageously, in the apparatus for treating a radioactive nitrate waste liquid, a carbon source supplied to the denitrification tank is one of or both of organic acid and sweetener, and air is temporarily supplied to the gas circulating line via an air-supply-amount adjusting valve.

Advantageously, in the apparatus for treating a radioactive nitrate waste liquid, the denitrification tank includes an oxidation-reduction potential meter that measures an oxidation-reduction potential of the denitrified liquid.

Advantageously, in the apparatus for treating a radioactive nitrate waste liquid includes an adjusting tank at an upstream of the denitrification tank. The adjusting tank includes: an electrical conductivity meter that measures a level of electric conductivity; an industrial-water introducing line; and an industrial-water supply-amount adjusting valve that is interposed through the industrial-water introducing line and adjusts an amount of water supplied based on a measurement value of the electrical conductivity meter.

Advantageously, in the apparatus for treating a radioactive nitrate waste liquid, the first solid-liquid separating unit and the second solid-liquid separating unit are solid-liquid separating films.

According to another aspect of the present invention, an apparatus for treating a radioactive nitrate waste liquid, includes: a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; and a reaeration tank that aerates and mixes a denitrification-treated liquid treated in the denitrification tank with active sludge in which the aerobic microorganism grows. The denitrification tank includes: a pH adjusting unit that supplies a pH adjuster used for adjusting pH of the nitrate waste liquid; a carbon-source supplying unit that supplies a carbon source to the denitrification tank; a weir that prevents flowing-out sludge from leaking out into the denitrification tank. The reaeration tank includes: a second solid-liquid separating unit that further separates the denitrification-treated liquid treated with the active sludge into a sludge-containing solid content and a treated liquid; and an air supplying unit that is arranged on a lower side of the second solid-liquid separating unit and supplies air into the reaeration tank.

According to another aspect of the present invention, a method for treating a radioactive nitrate waste liquid, includes: in a denitrification tank that accommodates active sludge that adsorbs or takes in a radioactive substance in a nitrate waste liquid containing nitrate and the radioactive substances and in which an anaerobic microorganism that reduces the nitrate to nitrogen gas grows, a step at which an active sludge treatment is performed by supplying a carbon source while adjusting pH of the nitrate waste liquid, and at a time of separating a denitrified liquid treated with the active sludge by using a first solid-liquid separating unit into a sludge-containing solid content and a denitrification-treated liquid, gas not containing oxygen is supplied thereby to accelerate a process for reducing an anaerobic microorganism and cleanse the active sludge adhered to the solid-liquid separating unit with the gas; and in a reaeration tank that aerates and mixes the denitrification-treated liquid treated in the denitrification tank with the active sludge, a step of further separating the denitrification-treated liquid treated with the active sludge into a sludge-containing solid content and a reaeration-treated liquid by using a second solid-liquid separating unit.

Effect of the Invention

The present invention includes a first solid-liquid separating unit that separates a denitrified liquid treated with active sludge in a denitrification tank into a sludge-containing solid content and a denitrification-treated liquid, and a second solid-liquid separating unit that further separates a reaerated liquid treated in a reaeration tank into a sludge-containing solid content and a reaeration-treated liquid. Therefore, minute sludge can be prevented from flowing out with a treated liquid.

Figure 1:
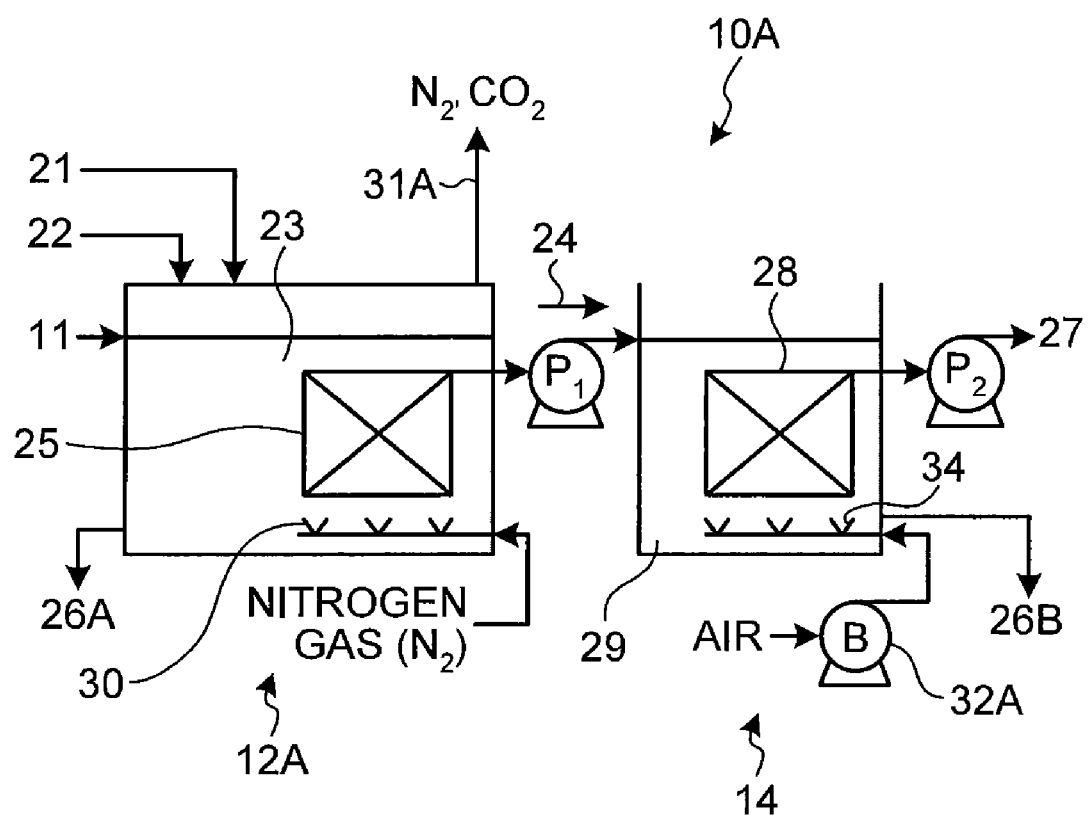
FIG. 1 is a conceptual diagram of an apparatus for treating a radioactive nitrate waste liquid according to a first embodiment of the present invention.

EXPLANATIONS OF LETTERS OR NUMERALS 10A to 10I apparatus for treating radioactive nitrate waste liquid
11 nitrate waste liquid
12A to 12G, 12I denitrification tank
14 reaeration tank
21 pH adjuster
22 carbon source
23 denitrified liquid
24 denitrification-treated liquid
25 first solid-liquid separating film
26A, 26B solid content (redundant sludge)
27 reaeration-treated liquid
28 second solid-liquid separating film
29 reaerated liquid
30 diffusion tube
31A gas discharge line
31B gas circulating line
32A, 32B blower
33 pressure valve
34 air supplying unit
35 gas-introducing line
36 pH sensor
37 carbon-dioxide-gas supply-amount adjusting valve
39 carbon-source supply-amount adjusting valve
41 air-supplying line
42 air-supply-amount adjusting valve
43 oxidation-reduction potential meter
50 nitrate waste liquid (undiluted)
51 adjusting tank
52 electrical conductivity meter (EC meter)
53 industrial-water introducing line
54 industrial-water supply-amount adjusting valve
55 nitrate-waste-liquid supplying line
61 industrial water
62 diluter
63 biological treatment device
65 sludge
67 sludge dewatering device
68 dewatered sludge
69 incinerator
70 treated liquid
71 incinerated ashes
72 cleansing water
80 weir
81 stirring unit
$P_3$ nitrate-waste-liquid supplying pump

BEST MODE(S) FOR CARRYING OUT THE INVENTION

Exemplary embodiments of the present invention will be explained below in detail with reference to the accompanying drawings. Note that the present invention is not limited to the embodiments. In addition, constituent elements in the embodiments include those that can be easily assumed by those skilled in the art or that are substantially equivalent.

First Embodiment

An apparatus for treating a radioactive nitrate waste liquid according to an embodiment of the present invention is explained with reference to the drawings.

FIG. 1 is a conceptual diagram of an apparatus for treating a radioactive nitrate waste liquid according to a first embodiment of the present invention.

As shown in FIG. 1, an apparatus 10A for treating a radioactive nitrate waste liquid according to the present embodiment is an apparatus for treating a radioactive nitrate waste liquid including a denitrification tank 12A which accommodates active sludge that adsorbs or takes in a radioactive substance in a nitrate waste liquid 11 containing nitrate and the radioactive substance and in which an anaerobic microorganism that reduces the nitrate to nitrogen gas grows, and a reaeration tank 14 in which a denitrification-treated liquid 24 treated in the denitrification tank 12A is aerated and mixed with the active sludge. The denitrification tank 12A further includes a pH adjusting unit (not shown) that supplies a pH adjuster 21 used for adjusting pH of the nitrate waste liquid 11, a carbon-source supplying unit (not shown) that supplies a carbon source 22 to the denitrification tank 12A, a first solid-liquid separating film 25 that is a first solid-liquid separating unit that separates a denitrified liquid 23 treated with the active sludge into a solid content containing sludge (redundant sludge 26A) and a treated liquid, and a gas supplying unit 30 that is arranged on a lower side of the first solid-liquid separating film 25 and supplies gas not containing oxygen (for example, one or both of nitrogen gas ($N_2$) and carbon dioxide gas ($CO_2$) into the denitrification tank 12A. The reaeration tank 14 includes a second solid-liquid separating film 28 or a second solid-liquid separating unit that reaerates the denitrification-treated liquid 24 treated with the active sludge to further separate a reaerated liquid 29 into redundant sludge 26B and a reaeration-treated liquid 27, and an air supplying unit 34 that is arranged on a lower side of the second solid-liquid separating film 28 and uses a blower 32A to supply air into the reaeration tank 14.

At a lower portion of the first solid-liquid separating film 25 and the second solid-liquid separating film 28, the gas supplying unit 30 and the air supplying unit 34 are arranged, respectively. When the supplied gas rises, a liquid mixed with the active sludge passes through surfaces of the separating films, and at this time, the liquid only permeates the films, and a solid-liquid separation is performed in this way. The active sludge that is left after the separation adheres to the film surface; however, the film surface is always cleansed with a flow of the supplied gas. As a result, the active sludge that adheres to the film surface is cleansed and reduced. This makes it possible to perform a solid-liquid separation by using the film surface that is always clean. In FIG. 1, reference character $P_1$ denotes a denitrification-treated-liquid supplying pump that supplies the denitrification-treated liquid 24 to the reaeration tank 14 and reference character $P_2$ denotes a reaeration-treated-liquid supplying pump that sends the reaeration-treated liquid 27.

In the apparatus 10A for treating a radioactive nitrate waste liquid according to the present embodiment, the first solid-liquid separating film 25 and the second solid-liquid separating film 28 are respectively arranged in the denitrification tank 12A and the reaeration tank 14. Accordingly, the minute sludge can be completely separated into the denitrified liquid 23 or the reaerated liquid 29. This can prevent the sludge from flowing out. Although not limited thereto, examples of types of the first solid-liquid separating film 25 and the second solid-liquid separating film 28 include well-known solid-liquid separating films such as a flat film and a hollow fiber film.

As a result, when the minute sludge is completely separated from the denitrification-treated liquid 24 or the reaeration-treated liquid 27, it is possible to decrease the concentration of suspended solid (SS) of the discharged reaeration-treated liquid 27.

When the first solid-liquid separating film 25 is installed within the denitrification tank 12A, it is possible to prevent denitrifying bacteria from flowing out, and there is no contamination of any other bacteria. Thus, only a large amount of denitrifying bacteria multiplied within the denitrification tank 12A exist in the tank. As a result, a sufficient amount of sludge can be secured, and the sludge concentration within the denitrification tank 12A can be maintained at a high level.

It is possible to maintain a high level of sludge concentration within the denitrification tank 12A, and thus the level of the denitrification performance of the denitrification tank 12A can be enhanced and the apparatus can be made compact.

When the first solid-liquid separating film 25 and the second solid-liquid separating film 28 are arranged, a particulate radioactive substance contained in the nitrate waste liquid 11 can be also separated from the reaeration liquid 29. Thus, it is possible to decrease the radioactive concentration of the reaeration-treated liquid 27 discharged to outside and to decrease the radioactive concentration of the reaeration-treated liquid 27.

In the apparatus 10A for treating a radioactive nitrate waste liquid according to the present embodiment, the pH of the denitrified liquid 23 in the denitrification tank 12A is preferably adjusted from 7.0 to 10.0. It is preferable that the pH is from 8.0 to 9.5, and more preferably the pH is 8.0 to 9.0. This is because when the pH of the denitrified liquid 23 exceeds 10.0, the microorganism is perished. Moreover, when the pH is less than 7.0, a reaction rate for a treatment for reducing the nitrogen gas in the microorganism is decreased.

In the apparatus 10A for treating a radioactive nitrate waste liquid according to the present embodiment, to improve an execution of the treatment for reducing the nitrogen gas by the anaerobic microorganism, the gas supplying unit 30 is arranged on a lower side (bottom surface side of the tank) of the first solid-liquid separating film 25 of the denitrification tank 12A so as to supply gas not containing oxygen (for example, nitrogen gas) to the denitrified liquid 23 of the denitrification tank 12A.

By supplying nitrogen gas into the denitrified liquid 23 in the denitrification tank 12A via the gas supplying unit 30, the denitrified liquid 23 in the denitrification tank 12A can be forcedly stirred and the treatment for reducing the nitrogen gas by the microorganisms can be accelerated. Moreover, when nitrogen gas is supplied via the gas supplying unit 30 from below the first solid-liquid separating film 25, the active sludge that adheres to the first solid-liquid separating film 25 can be reduced. As a result, due to a gas cleansing effect, clogging of the film can be prevented.

In the apparatus 10A for treating a radioactive nitrate waste liquid according to the present embodiment, nitrogen gas ($N_2$ gas) is supplied by the gas supplying unit. However, the present invention is not limited thereto, and any gas that does not contain oxygen, such as carbon dioxide gas ($CO_2$ gas) and an inactive gas, can be used.

Further, in the apparatus 10A for treating a radioactive nitrate waste liquid according to the present embodiment, nitrogen gas ($N_2$) and carbon dioxide gas ($CO_2$ gas) generated in the denitrification tank 12A are released to outside via a gas discharge line 31A.

In the apparatus 10A for treating a radioactive nitrate waste liquid according to the present embodiment, initially, the sludge used in sewage sludge or an industrial waste treatment is put in as seed sludge and active sludge multiplied until the active sludge concentration reaches, for example, about 5,000 to 20,000 mg/L, can be used. While the active sludge can be held by a granular carrier or a fibrous carrier, in the exemplary embodiments of the present invention, various types of such carriers are not used, and floating active sludge is preferably used.

In the apparatus 10A for treating a radioactive nitrate waste liquid according to the present embodiment, although the present invention is not limited thereto, examples of the carbon source 22 include organic acid such as acetic acid.

In the apparatus 10A for treating a radioactive nitrate waste liquid according to the present embodiment, although the present invention is not limited thereto, examples of the pH adjuster 21 include sulfuric acid and hydrochloric acid.

In the apparatus 10A for treating a radioactive nitrate waste liquid according to the present embodiment, as the microorganism contained in the active sludge in the denitrification tank 12, a well-known anaerobic microorganism that exhibits a denitrification performance can be used. Although not particularly limited thereto, in the reaeration tank 14, a well-known aerobic microorganism for a reaeration can be used.

In the apparatus 10A for treating a radioactive nitrate waste liquid according to the present embodiment, the solid-liquid separating film is used as a solid-liquid separating unit; however, the present invention is not limited thereto, and any unit that can separate the sludge and the liquid can be used.

As described above, in the apparatus 10A for treating a radioactive nitrate waste liquid according to the present embodiment, the first solid-liquid separating film 25 and the second solid-liquid separating film 28 are respectively arranged in the denitrification tank 12A and the reaeration tank 14. Accordingly, the minute sludge can be completely separated into the denitrification-treated liquid 24 and the reaeration-treated liquid 27. Thus, the radioactive substance and the sludge can be prevented from flowing out. Moreover, the concentration of suspended solid (SS) in the reaeration-treated liquid 27 that is discharged from the reaeration tank 14 and is separately treated can be improved.

Because a sufficient amount of sludge can be secured within the denitrification tank 12A, the sludge concentration within the denitrification tank 12A can be maintained at a high level. Therefore, a high-level denitrification performance of the denitrification tank 12A can be maintained and the apparatus can be made compact.

Test Example

By using the apparatus according to the present embodiment, a denitrification test was conducted on a nitrate waste liquid having an undiluted nitrate nitrogen concentration of 6700 to 9200 mg/L (salt concentration: 4.0 to 5.5%) by using methanol and acetic acid as a carbon source with a test temperature set to 20 to 25° C. (room temperature).

When the first solid-liquid separating film was not arranged in the denitrification tank, the denitrification performance reached 2 kg-N/m$^3$/d, whereas when the first solid-liquid separating film was arranged in the denitrification tank, the denitrification performance was improved to 7 kg-N/m$^3$/d.

Second Embodiment

An apparatus for treating a radioactive nitrate waste liquid according to a second embodiment of the present invention is explained with reference to FIG. 2.

An apparatus 10B for treating a radioactive nitrate waste liquid according to the present embodiment is configured substantially identical to the apparatus 10A for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 2:
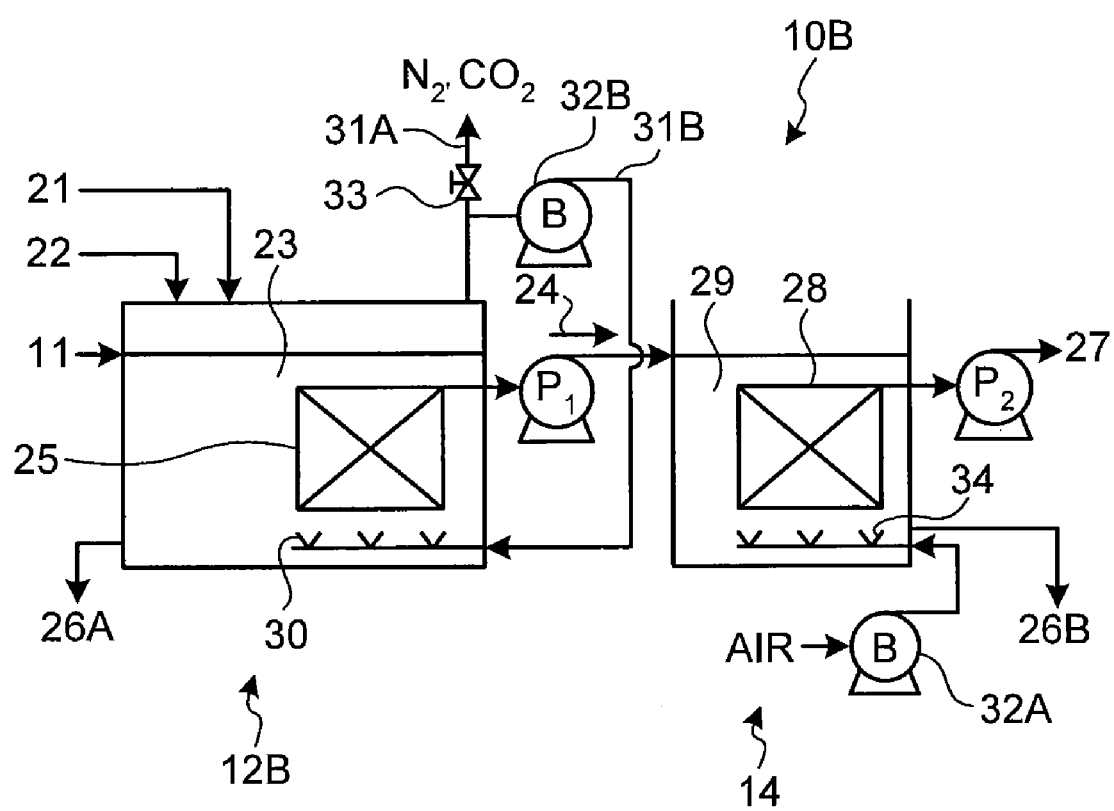
FIG. 2 is a schematic diagram of a configuration of an apparatus for treating a radioactive nitrate waste liquid according to a second embodiment of the present invention.

FIG. 2 is a schematic diagram of a configuration of the apparatus for treating a radioactive nitrate waste liquid according to the second embodiment of the present invention. As shown in FIG. 2, in the apparatus 10B for treating a radioactive nitrate waste liquid according to the present embodiment, a gas circulating line 31B that circulates within a denitrification tank 12B nitrogen gas ($N_2$) and carbon dioxide gas ($CO_2$ gas) produced by a reaction between the anaerobic microorganism and the nitrate present in the denitrified liquid 23 in the denitrification tank 12B is arranged and branched off from a part of the gas discharge line 31A.

As a result, the nitrogen gas ($N_2$) and the carbon dioxide gas ($CO_2$) generated in the denitrification tank 12B are fed to the gas supplying unit 30 by a blower 32B interposed through the gas circulating line 31B and then introduced into the denitrification tank 12B.

In this manner, the nitrogen gas ($N_2$) and the carbon dioxide gas ($CO_2$) generated as a result of the microorganism reaction within the denitrification tank 12B are re-circulated and re-used within the denitrification tank 12B. As a result, it is not necessary to separately arrange the nitrogen-gas supplying unit (as shown in FIG. 1) that supplies gas not containing oxygen. As a result, it is possible to eliminate the nitrogen-gas supplying unit and reduce gas purchasing costs.

Further, in the apparatus 10B for treating a radioactive nitrate waste liquid according to the present embodiment, there is arranged a pressure valve 33 that discharges a gas to outside from a portion of the gas discharge line 31A that discharges nitrogen gas ($N_2$) and carbon dioxide gas ($CO_2$) generated in the denitrification tank 12B. Thereby, redundant nitrogen gas ($N_2$) and carbon dioxide gas ($CO_2$) can be released by opening the pressure valve 33.

Thus, according to the present embodiment, because the nitrogen gas ($N_2$) and the carbon dioxide gas ($CO_2$) generated in the denitrification tank 12B are used, the gas consumes itself efficiently. As a result, the gas supply apparatus and gas purchasing costs can be reduced.

Third Embodiment

An apparatus for treating a radioactive nitrate waste liquid according to a third embodiment of the present invention is explained with reference to FIG. 3.

The apparatus for treating a radioactive nitrate waste liquid according to the present embodiment is configured substantially identical to the apparatus for treating a radioactive nitrate waste liquid according to the first embodiment shown in FIG. 1, and thus like reference numerals are denoted to like constituent elements of the apparatus for treating a radioactive nitrate waste liquid according to the first embodiment shown in FIG. 1, and redundant explanations thereof will be omitted.

Figure 3:
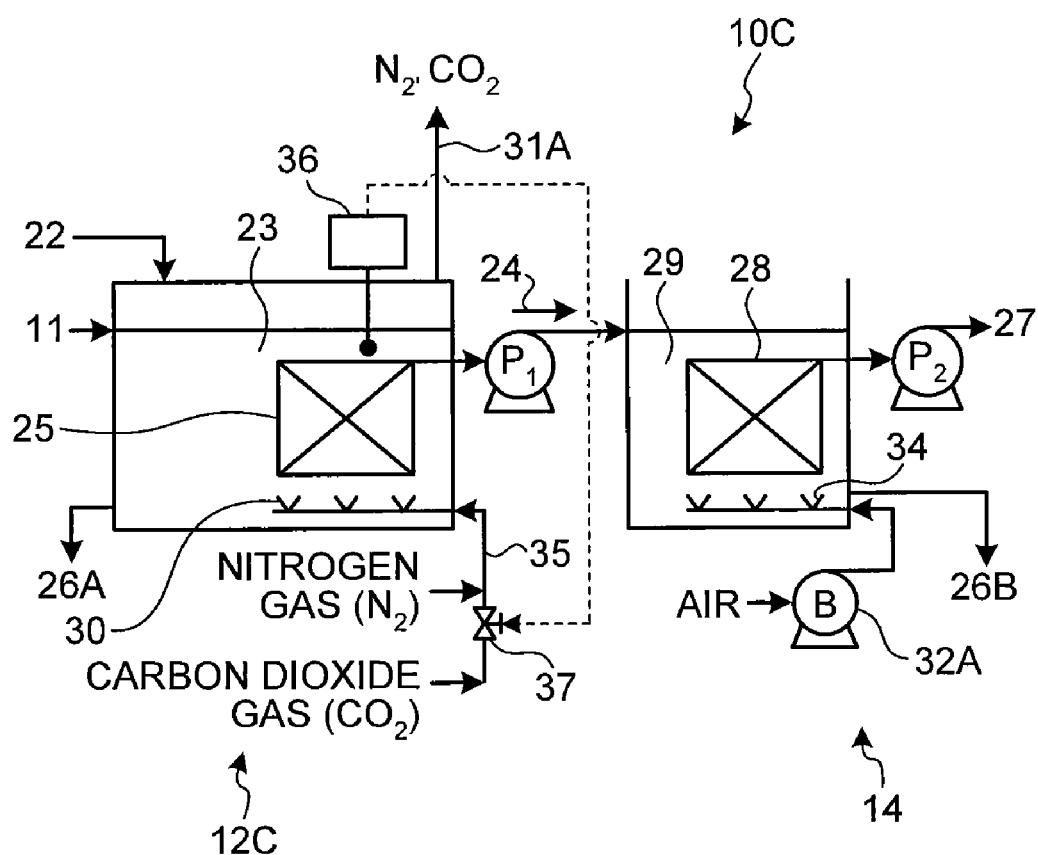
FIG. 3 is a schematic diagram of a configuration of an apparatus for treating a radioactive nitrate waste liquid according to a third embodiment of the present invention.

FIG. 3 is a schematic diagram of a configuration of the apparatus for treating a radioactive nitrate waste liquid according to the third embodiment of the present invention.

As shown in FIG. 3, in an apparatus 10C for treating a radioactive nitrate waste liquid according to the present embodiment, as the gas introduced into a denitrification tank 12C, carbon dioxide gas ($CO_2$) as well as nitrogen gas ($N_2$) is introduced as a pH treating agent.

That is, the apparatus 10C for treating a radioactive nitrate waste liquid according to the present embodiment includes a gas-introducing line 35 that introduces carbon dioxide gas ($CO_2$) and nitrogen gas ($N_2$), a pH sensor 36 that measures pH in the denitrified liquid 23, and a carbon-dioxide-gas supply-amount adjusting valve 37 that adjusts the amount of carbon dioxide gas ($CO_2$) supplied as the pH treating agent to the denitrification tank 12C.

When the pH of the denitrified liquid 23 measured by the pH sensor 36 is equal to or more than 9.4, the carbon-dioxide-gas supply-amount adjusting valve 37 is opened to lower the pH of the denitrified liquid 23. On the other hand, when the pH in the denitrification tank 12C measured by the pH sensor 36 is equal to or less than 7.5, the carbon-dioxide-gas supply-amount adjusting valve 37 is closed to raise the pH in the denitrification tank 12C. This eliminates necessity of adding a pH adjuster such as sulfuric acid and hydrochloric acid.

In this manner, according to the apparatus 10C for treating a radioactive nitrate waste liquid of the present embodiment, when the pH in the denitrification tank 12C is measured by the pH sensor 36 to control the pH in the denitrification tank 12C, the microorganism in the denitrification tank 12C becomes capable of an efficient denitrification reaction, and thus it is possible to prevent inhibition of the denitrification reaction by the microorganism in the denitrification tank 12C.

Further, in the apparatus 10C for treating a radioactive nitrate waste liquid according to the present embodiment, carbon dioxide gas ($CO_2$) can be used as the pH adjuster 21.

This is because when the hydrochloric acid is used as the pH adjuster 21, the apparatus is eroded, and when the sulfuric acid is used, sodium sulfate is produced. In the latter case, the amount to be mixed has its limit, and accordingly a solidified form increases, resulting in an increase in disposal expense.

On the other hand, when the carbon dioxide gas ($CO_2$) is used as the pH adjuster 21, a remaining salt caused when secondary waste produced when the reaeration-treated liquid 27 is separately treated is solidified becomes sodium carbonate or sodium hydrogen carbonate. The result is that it is possible to reduce the amount of solidified form to be generated that is obtained at the time of incinerating and solidifying a concentrate.

Therefore, according to the present embodiment, the carbon dioxide gas ($CO_2$) that is separately supplied is used for cleansing the first solid-liquid separating film 25 and used as the pH adjuster 21, and thus it is possible to prevent inhibition of the denitrification reaction. At the same time, it is possible to reduce the amount of solidified form to be generated that is obtained at the time of incinerating and solidifying secondary waste produced when the reaeration-treated liquid 27 is treated.

Fourth Embodiment

An apparatus for treating a radioactive nitrate waste liquid according to a fourth embodiment of the present invention is explained with reference to FIG. 4.

The apparatus for treating a radioactive nitrate waste liquid according to the present embodiment is configured substantially identical to the apparatus for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 4:
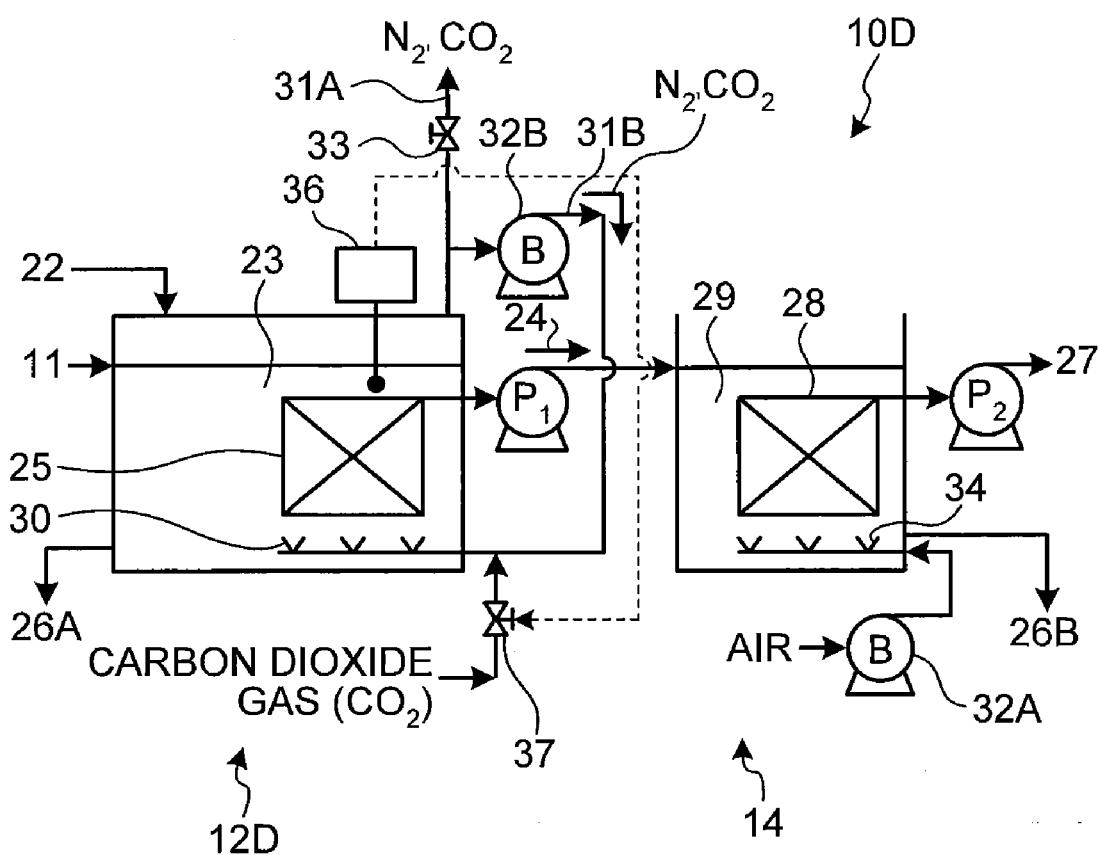
FIG. 4 is a schematic diagram of a configuration of an apparatus for treating a radioactive nitrate waste liquid according to a fourth embodiment of the present invention.

FIG. 4 is a schematic diagram of a configuration of the apparatus for treating a radioactive nitrate waste liquid according to the fourth embodiment of the present invention.

As shown in FIG. 4, in an apparatus 10D for treating a radioactive nitrate waste liquid according to the present embodiment includes the gas circulating line 31B (that introduces the carbon dioxide gas ($CO_2$)) only of the apparatus 10B for treating a radioactive nitrate waste liquid according to the second embodiment shown in FIG. 2, the pH sensor 36 that measures the pH of the denitrified liquid 23 in the denitrification tank 12C of the apparatus 10C for treating a radioactive nitrate waste liquid according to the third embodiment shown in FIG. 3, and the carbon-dioxide-gas supply-amount adjusting valve 37 that adjusts the amount of carbon dioxide gas ($CO_2$) supplied to a denitrification tank 12D.

When nitrogen gas ($N_2$) and carbon dioxide gas ($CO_2$) generated in the denitrification tank 12D are used and circulated into the denitrification tank 12D by using the gas circulating line 31B, it is possible to reduce the amount of carbon dioxide gas ($CO_2$) introduced from outside.

Further, the carbon dioxide gas ($CO_2$) that is separately supplied is used for cleansing the first solid-liquid separating film 25 and used as the pH adjuster 21, and thus it is possible to prevent inhibition of the denitrification reaction. At the same time, it is possible to reduce the amount of solidified form to be generated that is obtained at the time of incinerating and solidifying secondary waste produced when the reaeration-treated liquid 27 is treated. This eliminates necessity of adding the pH adjuster such as sulfuric acid and hydrochloric acid.

Fifth Embodiment

An apparatus for treating a radioactive nitrate waste liquid according to a fifth embodiment of the present invention is explained with reference to FIG. 5.

The apparatus for treating a radioactive nitrate waste liquid according to the present embodiment is configured substantially identical to the apparatus for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 5:
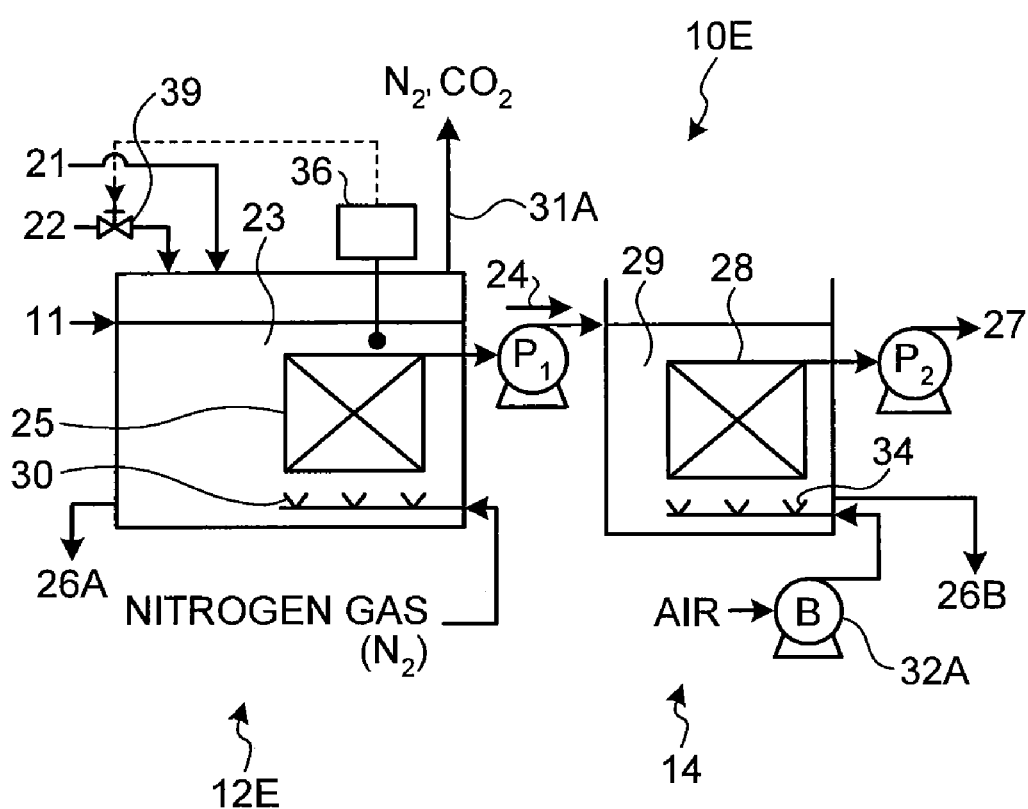
FIG. 5 is a schematic diagram of a configuration of an apparatus for treating a radioactive nitrate waste liquid according to a fifth embodiment of the present invention.

FIG. 5 is a schematic diagram of a configuration of an apparatus 10E for treating a radioactive nitrate waste liquid according to the fifth embodiment of the present invention.

As shown in FIG. 5, the apparatus 10E for treating a radioactive nitrate waste liquid according to the present embodiment uses acetic acid as the carbon source 22, and includes the pH sensor 36 that measures the pH of the nitrate waste liquid 11 in the denitrification tank 12A of the apparatus 10A for treating a radioactive nitrate waste liquid according to the first embodiment shown in FIG. 1 and a carbon-source supply-amount adjusting valve 39 that adjusts the amount of the carbon source 22 supplied to a denitrification tank 12E in an acetic-acid supplying line.

The acetic acid used as the carbon source functions also as the pH adjuster, and thus it is possible to reduce the amount of or eliminate necessity of the pH adjuster such as sulfuric acid and hydrochloric acid.

When the pH in the denitrification tank 12E measured by the pH sensor 36 is equal to or more than 9.0, the carbon-source supply-amount adjusting valve 39 is opened to lower the pH in the denitrification tank 12E, and when the pH in the denitrification tank 12E measured by the pH sensor 36 is equal to or less than 8.0, the carbon-source supply-amount adjusting valve 39 is closed to raise the pH in the denitrification tank 12E. In this manner, it is possible to prevent a decrease in pH caused due to excessive addition of acetic acid supplied as the carbon source and a decrease in performance inherent in nitrogen caused along therewith.

Thus, when the pH in the denitrification tank 12E is measured by the pH sensor 36 to constantly control the pH in the denitrification tank 12E, the microorganism in the denitrification tank 12E can perform a denitrification reaction. Accordingly, it is possible to prevent inhibition of the denitrification reaction by the microorganism in the denitrification tank 12E.

In the present embodiment, the acetic acid as the carbon source 22 is never added excessively, and thus it is possible to reduce the amount of acetic acid to be used. That is, in the conventional technique, when such an adjustment is not performed, the redundant acetic acid is dissolved in the reaeration tank 14 and a part thereof is left as the redundant sludge 26B. On the other hand, according to the apparatus 10E for treating a radioactive nitrate waste liquid of the present embodiment, the amount of acetic acid flown out to the reaeration tank 14 is reduced, and thus it is possible to reduce the amount of redundant sludge to be generated in the reaeration tank 14.

Sixth Embodiment

An apparatus for treating a radioactive nitrate waste liquid according to a sixth embodiment of the present invention is explained with reference to FIG. 6.

The apparatus for treating a radioactive nitrate waste liquid according to the present embodiment is configured substantially identical to the apparatus for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 6:
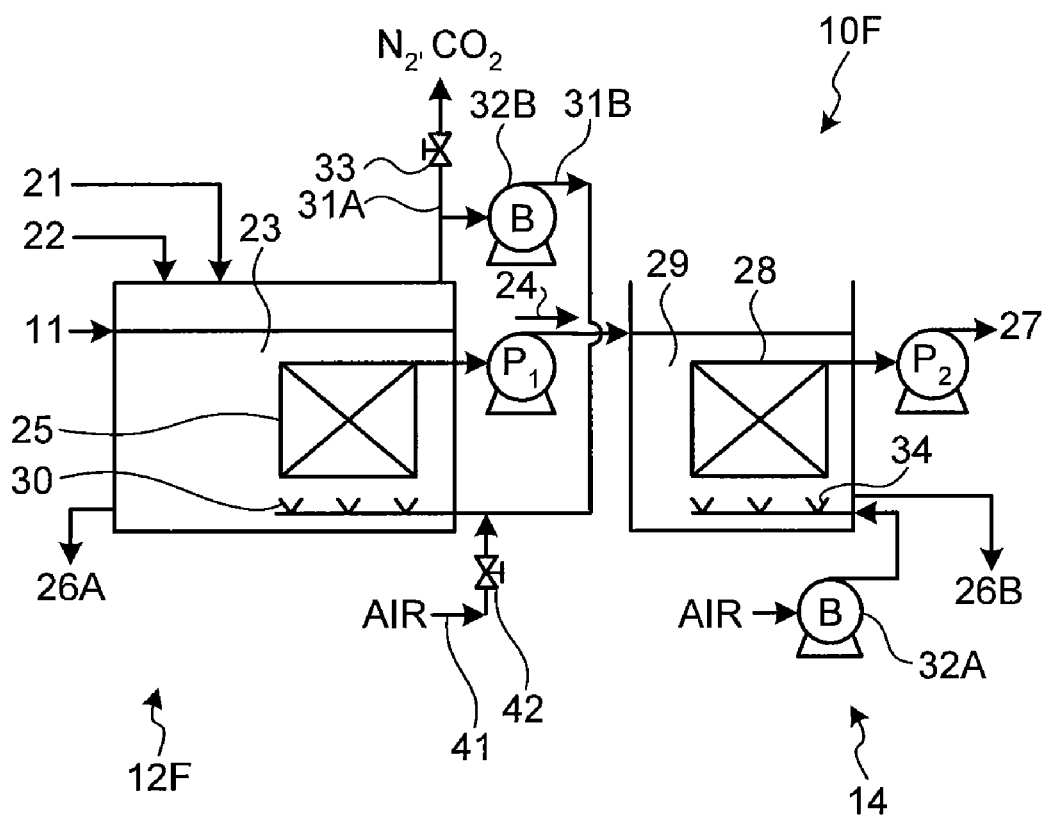
FIG. 6 is a schematic diagram of a configuration of an apparatus for treating a radioactive nitrate waste liquid according to a sixth embodiment of the present invention.

FIG. 6 is a schematic diagram of a configuration of the apparatus for treating a radioactive nitrate waste liquid according to the sixth embodiment of the present invention.

As shown in FIG. 6, in an apparatus 10F for treating a radioactive nitrate waste liquid according to the present embodiment, instead of nitrogen gas ($N_2$), air is supplied to the denitrification tank 12E. Furthermore, the apparatus 10E includes a gas circulating line that circulates the nitrogen gas and the carbon dioxide gas produced in the denitrification tank 12F into the denitrification tank 12F.

That is, the apparatus 10F for treating a radioactive nitrate waste liquid according to the present embodiment includes an air-supplying line 41 that supplies air instead of nitrogen gas to the denitrification tank of the apparatus 10A for treating a radioactive nitrate waste liquid according to the first embodiment shown in FIG. 1, and the gas circulating line 31B that circulates the nitrogen gas ($N_2$) and the carbon dioxide gas ($CO_2$) produced in the denitrification tank of the apparatus 10B for treating a radioactive nitrate waste liquid according to the second embodiment shown in FIG. 2 into the denitrification tank 12F.

Further, in the apparatus 10F for treating a radioactive nitrate waste liquid according to the present embodiment, an air-supply-amount adjusting valve 42 is arranged in the air-supplying line 41, and the air-supply-amount adjusting valve 42 is repeatedly opened and closed at regular intervals. The valve 42 can be opened and closed, for example, for about two to five minutes a week, to supply air intermittently to the denitrification tank 12F.

For example, when acetic acid and glucose are used as the carbon source, if an oxidation reduction potential (ORP) decreases, the reaction progresses with the organic substance only and the nitrate is not used. Therefore, there is a case that the nitrate does not decrease; however, by supplying a slight amount of oxygen as mentioned above, the decrease in the denitrification performance can be prevented.

In the present embodiment, acetic acid is used as the organic acid; however, the present invention is not limited thereto. For example, organic acid such as formic acid and propionic acid; and sweetener such as glucose, fructose, maltose, sucrose, and galactose can be also used.

It is possible to increase the types of carbon sources that can be used to treat the high-concentration nitrate waste liquid 11.

A reductive atmosphere in the denitrification tank 12F is mitigated, and thus generation of hydrogen sulfide ($H_2S$) can be prevented and it is possible to suppress the corrosion of piping of a reaction container, for example.

Seventh Embodiment

An apparatus for treating a radioactive nitrate waste liquid according to a seventh embodiment of the present invention is explained with reference to FIG. 7.

The apparatus for treating a radioactive nitrate waste liquid according to the present embodiment is configured substantially identical to the apparatus for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 7:
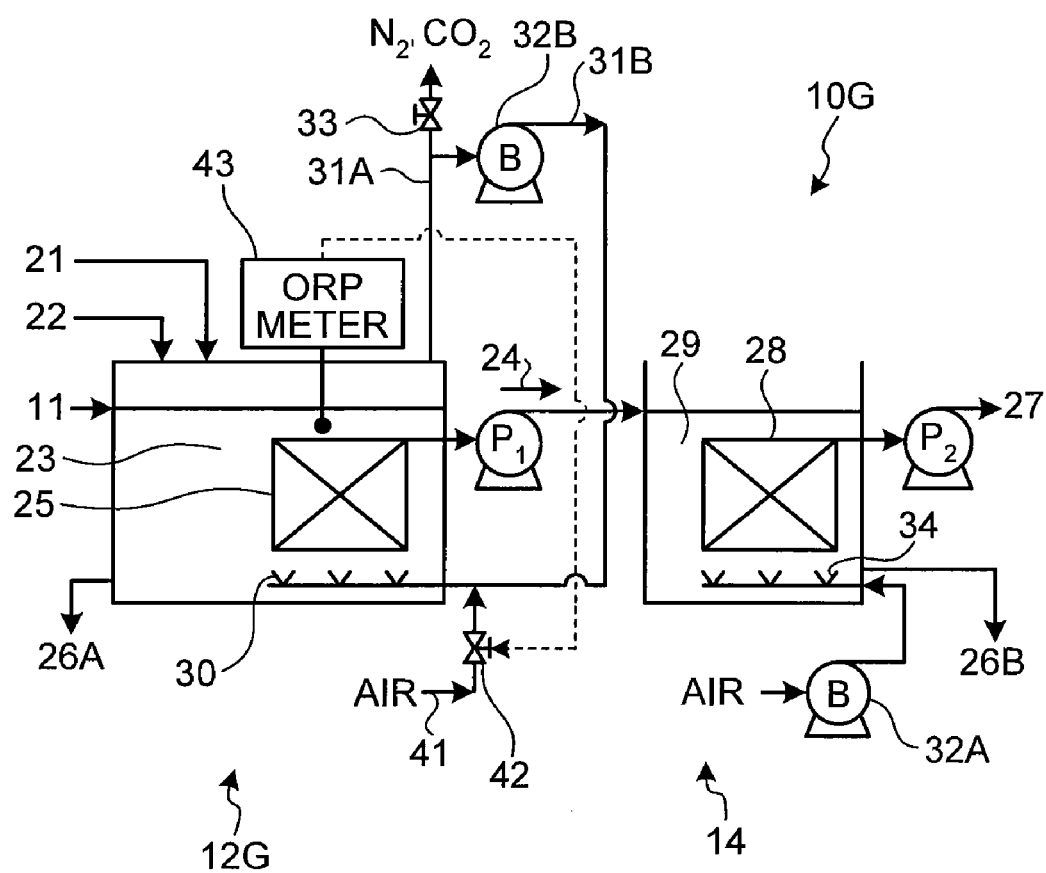
FIG. 7 is a schematic diagram of a configuration of an apparatus for treating a radioactive nitrate waste liquid according to a seventh embodiment of the present invention.

FIG. 7 is a schematic diagram of a configuration of the apparatus for treating a radioactive nitrate waste liquid according to the seventh embodiment of the present invention.

As shown in FIG. 7, in an apparatus 10G for treating a radioactive nitrate waste liquid according to the present embodiment, instead of nitrogen gas, air is supplied to the denitrification tank, and includes the gas circulating line 31B that circulates nitrogen gas ($N_2$) and carbon dioxide gas ($CO_2$) produced in a denitrification tank 12G into the denitrification tank 12G.

That is, the apparatus 10G for treating a radioactive nitrate waste liquid according to the present embodiment is configured by adding, in the denitrification tank 12G, an oxidation-reduction potential meter (ORP meter) 43 that measures the oxidation reduction potential (ORP) of the denitrified liquid 23, to the apparatus 10F for treating a radioactive nitrate waste liquid according to the sixth embodiment shown in FIG. 6.

Based on a value of the oxidation-reduction potential measured by the oxidation-reduction potential meter 43 arranged in the denitrification tank, the air-supply-amount adjusting valve 42 is controlled so that the amount of air supplied to the denitrification tank 12G is adjusted.

Specifically, it suffices that when the oxidation-reduction potential of the denitrified liquid 23 in the denitrification tank 12G that is measured by the oxidation-reduction potential meter 43 is −350 millivolts, preferably −300 millivolts, the air-supply-amount adjusting valve 42 is opened.

On the other hand, it suffices that when the oxidation-reduction potential of the denitrified liquid 23 in the denitrification tank 12G that is measured by the oxidation-reduction potential meter 43 is −50 millivolts, preferably −100 millivolts, the air-supply-amount adjusting valve 42 is closed.

When the oxidation-reduction potential of the denitrified liquid 23 in the denitrification tank 12G is measured by the oxidation-reduction potential meter 43, the oxidation-reduction potential of the denitrified liquid 23 in the denitrification tank 12G can be controlled within a constant range, and thus, even when the oxidation-reduction potential rises abnormally, a decrease in denitrification performance can be prevented.

Eighth Embodiment

An apparatus for treating a radioactive nitrate waste liquid according to an eighth embodiment of the present invention is explained with reference to FIG. 8.

The apparatus for treating a radioactive nitrate waste liquid according to the present embodiment is configured substantially identical to the apparatus for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 8:
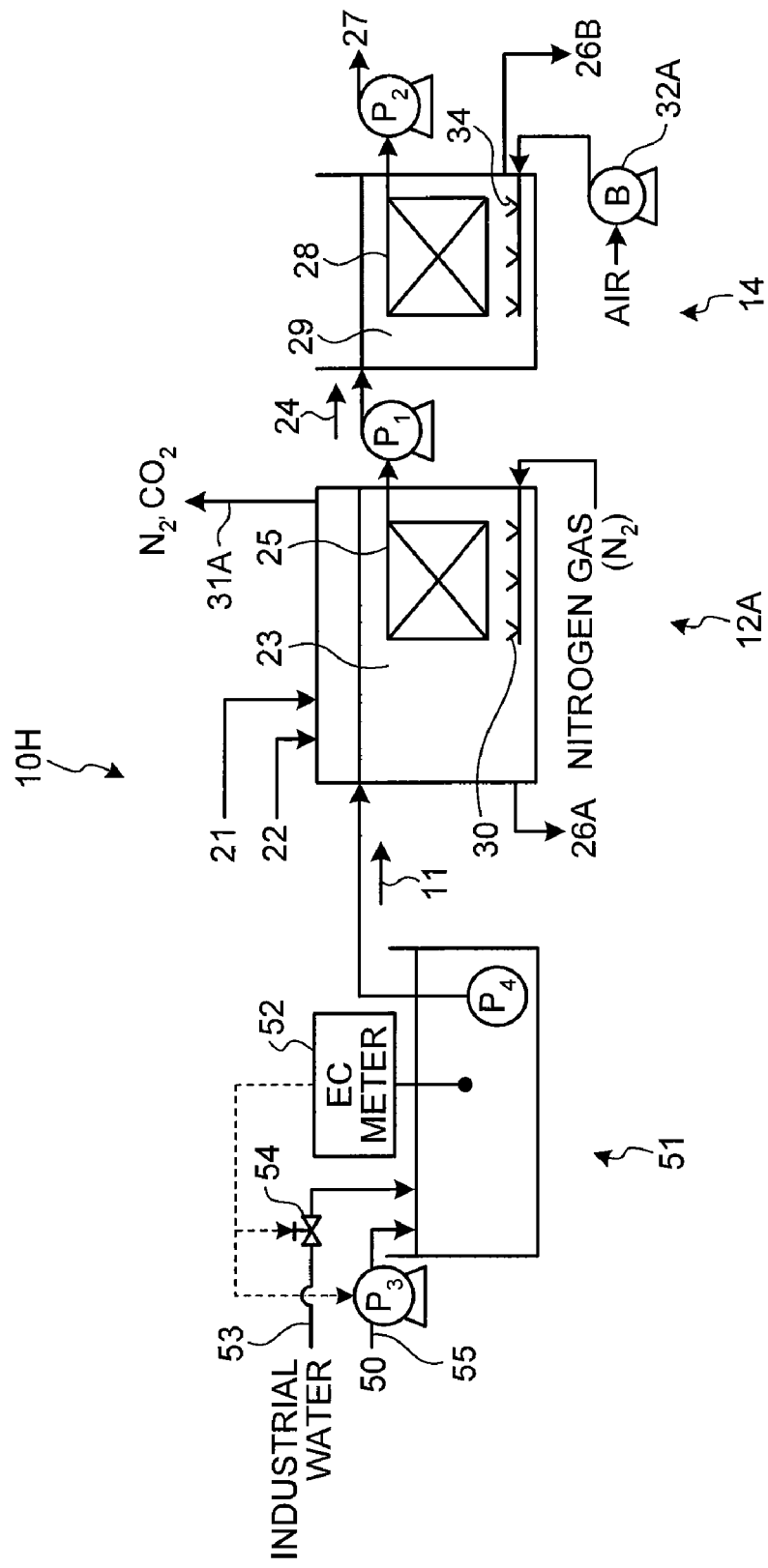
FIG. 8 is a schematic diagram of a configuration of an apparatus for treating a radioactive nitrate waste liquid according to an eighth embodiment of the present invention.

FIG. 8 is a schematic diagram of a configuration of the apparatus for treating a radioactive nitrate waste liquid according to the eighth embodiment of the present invention.

As shown in FIG. 8, in an apparatus 10H for treating a radioactive nitrate waste liquid according to the present embodiment, an adjusting tank 51 that supplies a nitrate waste liquid (undiluted: salt concentration of 30 to 40%) 50 is arranged at an upstream of the denitrification tank 12A of the apparatus 10A for treating a radioactive nitrate waste liquid according to the first embodiment shown in FIG. 1. The adjusting tank 51 includes an electrical conductivity meter (EC meter) 52 that measures a level of electric conductivity, an industrial-water introducing line 53, and an industrial-water supply-amount adjusting valve 54 which is arranged in the industrial-water introducing line 53 and which adjusts a flow rate of water to be diluted based on a measurement value of the electrical conductivity meter (EC meter) 52.

The industrial-water supply-amount adjusting valve 54 arranged in the industrial-water introducing line 53 is controlled based on the EC value measured by the electrical conductivity meter (EC meter) 52 arranged in the adjusting tank 51 to adjust the flow rate of water supplied to the adjusting tank 51.

Specifically, when the EC value measured by the electrical conductivity meter (EC meter) 52 is high, the industrial-water supply-amount adjusting valve 54 is opened, and when the EC value measured by the electrical conductivity meter (EC meter) 52 is low, the industrial-water supply-amount adjusting valve 54 is closed.

In the apparatus 10H for treating a radioactive nitrate waste liquid according to the present embodiment, when a biological treatment is performed in a high salt concentration state of about 4%, for example, by diluting the nitrate waste liquid (undiluted: salt concentration of 30 to 40%), a control range of an EC value measured by the electrical conductivity meter (EC meter) 52 at this time is preferably from 50 to 70 mS/cm, and more preferably from 53 to 68 mS/cm.

In the apparatus 10H for treating a radioactive nitrate waste liquid according to the present embodiment, a nitrate-waste-liquid supplying pump $P_3$ is arranged in a nitrate-waste-liquid supplying line 55 that feeds the nitrate waste liquid 50 (undiluted liquid) to the adjusting tank 51. Based on the EC value measured by the electrical conductivity meter (EC meter) 52, the nitrate-waste-liquid supplying pump $P_3$ is controlled, and a supply amount of the nitrate waste liquid 50 to be fed to the adjusting tank 51 is thus adjusted.

Specifically, when the EC value measured by the electrical conductivity meter (EC meter) 52 is high, the nitrate-waste-liquid supplying pump $P_3$ is stopped to halt supplying of the undiluted nitrate waste liquid (undiluted liquid) 50 to the adjusting tank 51, and when the EC value measured by the electrical conductivity meter (EC meter) 52 is low, the nitrate-waste-liquid supplying pump $P_3$ is operated and the nitrate waste liquid 50 (undiluted liquid) is supplied to the adjusting tank 51.

Accordingly, the concentration of a high-concentration nitrate waste liquid from treatment facilities is not always constant, and thus, even when the concentration of the nitrate waste liquid (undiluted liquid) 50 is not constant, it is possible to prevent transferring variation of the salt concentration in the nitrate waste liquid (undiluted liquid) 50 to the denitrification tank 12A. This makes it possible to prevent a significant decrease in denitrification performance caused when the salt concentration is greatly varied.

Further, the nitrate waste liquid (diluted liquid) 11 with a constant salt concentration can be supplied to the denitrification tank 12A via the nitrate-waste-liquid supplying pump $P_4$, and thus the denitrification performance can be stabilized.

Ninth Embodiment

An apparatus for treating a radioactive nitrate waste liquid according to a ninth embodiment of the present invention is explained with reference to FIG. 9.

An apparatus 10I for treating a radioactive nitrate waste liquid according to the present embodiment is configured substantially identical to the apparatus 10A for treating a radioactive nitrate waste liquid according to the first embodiment shown in FIG. 1, and thus like reference letters or numerals are denoted to like constituent elements of the apparatus for treating a radioactive nitrate waste liquid according to the first embodiment shown in FIG. 1, and redundant explanations thereof will be omitted.

Figure 9:
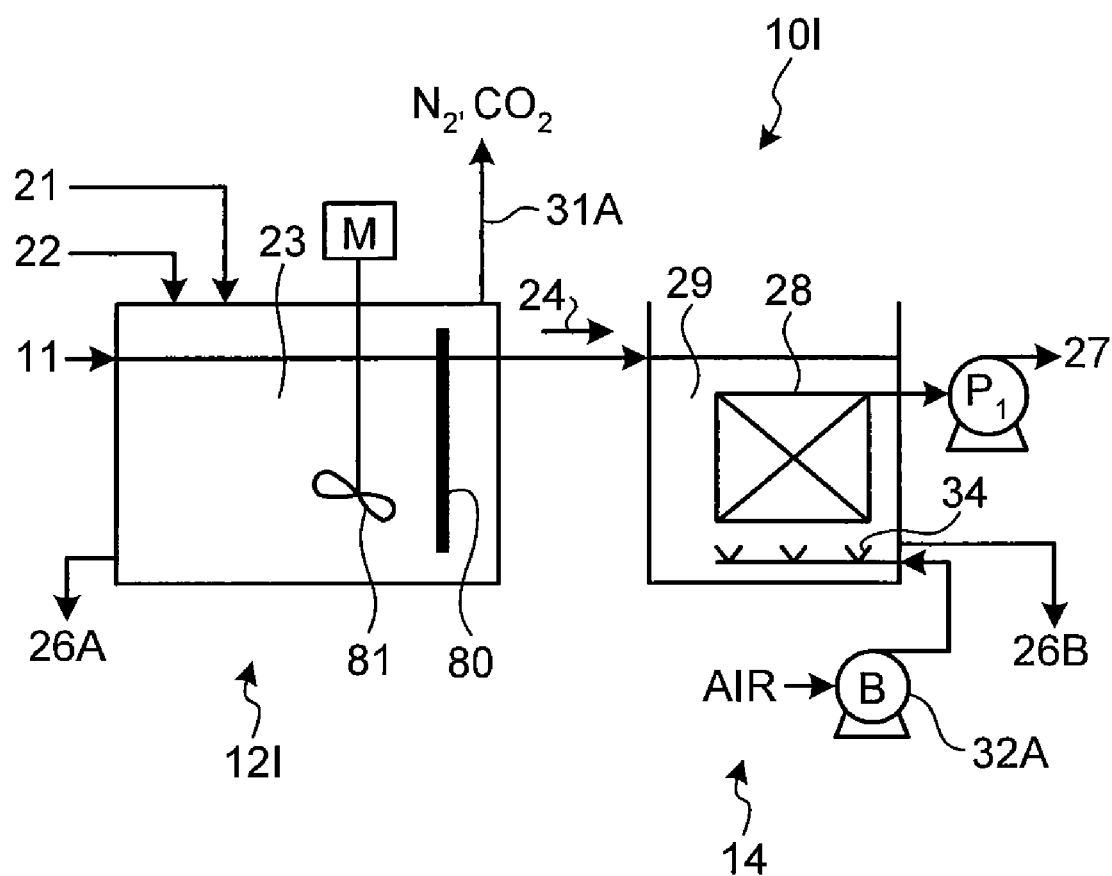
FIG. 9 is a schematic diagram of a configuration of an apparatus for treating a radioactive nitrate waste liquid according to a ninth embodiment of the present invention.

FIG. 9 is a schematic diagram of a configuration of the apparatus for treating a radioactive nitrate waste liquid according to the ninth embodiment of the present invention. As shown in FIG. 9, in the apparatus 10I for treating a radioactive nitrate waste liquid according to the present embodiment, a denitrification tank 12I includes, instead of the first solid-liquid separating film 25, a weir 80 that prevents flowing-out sludge from leaking out. A stirring unit 81 that stirs the content inside of the denitrification tank 12I is also provided.

Due to the installation of the weir 80, a part of the sludge in the denitrification tank 12I deposits and remains in the denitrification tank 12I.

As a result, the sludge concentration can be increased, and thus the range over which the nitrate concentration can be applied is widened.

Tenth Embodiment

A biological treatment system using an apparatus for treating a radioactive nitrate waste liquid according to a tenth embodiment of the present invention is explained with reference to FIG. 10.

As the apparatus for treating a radioactive nitrate waste liquid according to the present embodiment, any one of the apparatuses for treating a radioactive nitrate waste liquid according to the first to ninth embodiments shown in FIGS. 1 to 9 can be used, and thus explanations thereof will be omitted.

Figure 10:
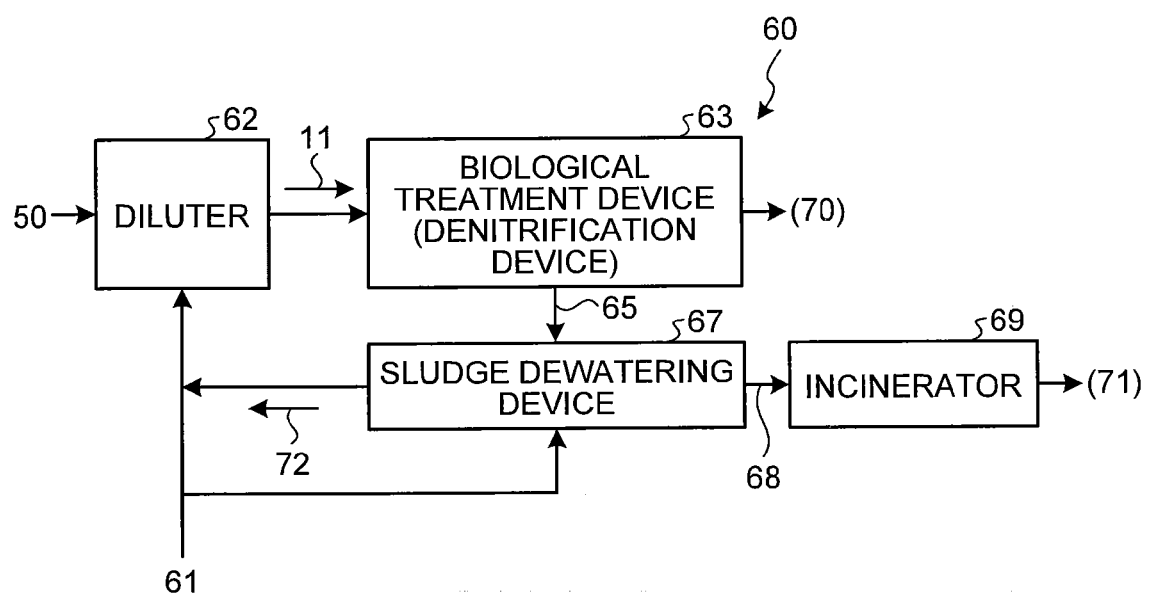
FIG. 10 is a schematic diagram of a configuration of a biological treatment system using an apparatus for treating a radioactive nitrate waste liquid according to a tenth embodiment of the present invention.
Figure 11:
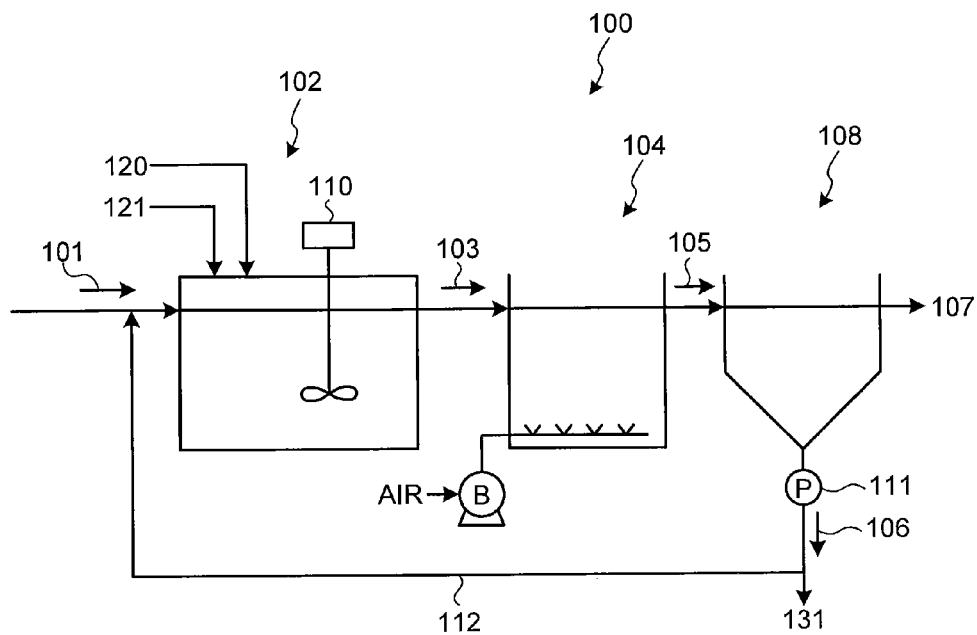
FIG. 11 is a schematic diagram of a configuration of a conventional apparatus for treating a radioactive nitrate waste liquid utilizing an organism.

As shown in FIG. 10, a biological treatment system 60 according to the present embodiment includes a diluter 62 that dilutes the nitrate waste liquid (undiluted liquid) 50 with industrial water 61, a biological treatment device (any one of the apparatuses for treating a radioactive nitrate waste liquid according to the first to ninth embodiments) 63 in which nitrate ions in the diluted nitrate waste liquid 11 are microbially treated for reduction with nitrogen and reaeration, a sludge dewatering device 67 that separates sludge 65 and a treated liquid 70 from the biologically treated liquid treated in the biological treatment device 63 and dewaters the separated sludge 65, and an incinerator 69 that incinerates dewatered sludge 68.

The diluter 62 operates in the adjusting tank 51 that dilutes an undiluted liquid as shown in FIG. 8 corresponding to the eighth embodiment described above.

The biological treatment device 63 is an apparatus for treating a radioactive nitrate waste liquid including one of the denitrification tanks 12A to 12I and the reaeration tank 14.

The sludge dewatering device 67 dewaters the redundant sludge discharged from the denitrification tank and the reaeration tank of the biological treatment device 63. The incinerator 69 incinerates the dewatered sludge 68 or secondary waste discharged from the sludge dewatering device 67 into incinerated ashes 71.

In the biological treatment device 63 that biologically treats the nitrate waste liquid having a high salt concentration, at the time of dewatering the redundant sludge, the salt concentration in the water that adheres to the sludge is high, and thus an amount of secondary waste (incinerated ashes) occasionally increases. For this, in the sludge dewatering device 67, the industrial water 61 is added to flush the adhered liquid having a high salt concentration, and flushed cleansing water 72 is used as diluting water in the diluter 62 that dilutes the nitrate waste liquid 11.

Therefore, a part of the industrial water 61 used in the diluter 62 is used for cleansing at the time of dewatering, and thus there is no need to use additional industrial water 61. Further, by decreasing the salt concentration in the adhering water, the amount of the secondary waste (incinerated ashes) can be decreased to about ½.

INDUSTRIAL APPLICABILITY

As described above, by using the apparatus for treating a radioactive nitrate waste liquid according to the present invention, a waste liquid with a high nitrate concentration discharged from nuclear facilities such as a reprocessing plant can be microbially treated efficiently, and minute sludge can be prevented from flowing out with a treated liquid.

The invention claimed is:

1. An apparatus for treating a radioactive nitrate waste liquid, comprising:
   a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; and
   a reaeration tank that aerates and mixes a denitrification-treated liquid treated in the denitrification tank with active sludge in which the aerobic microorganism grows, wherein
   the denitrification tank includes:
   a pH adjusting unit that supplies a pH adjuster used for adjusting pH of the nitrate waste liquid;
   a carbon-source supplying unit that supplies a carbon source to the denitrification tank;
   a first solid-liquid separating unit that separates a denitrified liquid treated with the active sludge into a sludge-containing solid content and a denitrification-treated liquid; and
   a gas supplying unit that is arranged on a lower side of the first solid-liquid separating unit and supplies gas not containing oxygen into the denitrification tank, and
   the reaeration tank includes:
   a second solid-liquid separating unit that further separates the denitrification-treated liquid treated with the active sludge into a sludge-containing solid content and a treated liquid; and
   an air supplying unit that is arranged on a lower side of the second solid-liquid separating unit and supplies air into the reaeration tank.

2. The apparatus for treating a radioactive nitrate waste liquid according to claim 1, wherein pH of the denitrified liquid in the denitrification tank is from 7.0 to 10.0.

3. The apparatus for treating a radioactive nitrate waste liquid according to claim 1, wherein the denitrification tank includes a gas circulating line through which nitrogen gas and carbon dioxide gas produced by a reaction between the anaerobic microorganism and the nitrate in the denitrified liquid are circulated into the denitrification tank.

4. The apparatus for treating a radioactive nitrate waste liquid according to claim 1, further comprising:
   a pH sensor that measures pH of the denitrified liquid; and
   a carbon-dioxide-gas supply-amount adjusting valve that adjusts an amount of carbon dioxide gas supplied to the denitrification tank.

5. The apparatus for treating a radioactive nitrate waste liquid according to claim 1, wherein a carbon source supplied to the denitrification tank is acetic acid, and
the apparatus further includes:
a pH sensor that measures pH of the denitrified liquid; and
a carbon-source supply-amount adjusting valve that adjusts an amount of a carbon source supplied to the denitrification tank.

6. The apparatus for treating a radioactive nitrate waste liquid according to claim 3, wherein
a carbon source supplied to the denitrification tank is one of or both of organic acid and sweetener, and
air is temporarily supplied to the gas circulating line via an air-supply-amount adjusting valve.

7. The apparatus for treating a radioactive nitrate waste liquid according to claim 6, wherein the denitrification tank includes an oxidation-reduction potential meter that measures an oxidation-reduction potential of the denitrified liquid.

8. The apparatus for treating a radioactive nitrate waste liquid according to claim 1, comprising an adjusting tank at an upstream of the denitrification tank, wherein
the adjusting tank includes:
an electric conductivity meter that measures a level of electric conductivity;
an industrial-water introducing line; and
an industrial-water supply-amount adjusting valve that is interposed through the industrial-water introducing line and adjusts an amount of water supplied based on a measurement value of the electrical conductivity meter.

9. The apparatus for treating a radioactive nitrate waste liquid according to claim 1, wherein the first solid-liquid separating unit and the second solid-liquid separating unit are solid-liquid separating films.

10. An apparatus for treating a radioactive nitrate waste liquid, comprising:
    a denitrification tank that accommodates active sludge which adsorbs or takes in a radioactive substance in a nitrate waste liquid containing nitrate and the radioactive substance and in which an anaerobic microorganism that reduces the nitrate to nitrogen gas grows; and
    a reaeration tank that aerates and mixes a denitrification-treated liquid treated in the denitrification tank with active sludge in which the aerobic microorganism grows, wherein
    the denitrification tank includes:
    a pH adjusting unit that supplies a pH adjuster used for adjusting pH of the nitrate waste liquid;
    a carbon-source supplying unit that supplies a carbon source to the denitrification tank;
    a weir that prevents flowing-out sludge from leaking out into the denitrification tank, and
    the reaeration tank includes:
    a second solid-liquid separating unit that further separates the denitrification-treated liquid treated with the active sludge into a sludge-containing solid content and a treated liquid; and
    an air supplying unit that is arranged on a lower side of the second solid-liquid separating unit and supplies air into the reaeration tank.

11. A method for treating a radioactive nitrate waste liquid, comprising:
    in a denitrification tank that accommodates active sludge that adsorbs or takes in a radioactive substance in a nitrate waste liquid containing nitrate and the radioactive substances and in which an anaerobic microorganism that reduces the nitrate to nitrogen gas grows, a step at which an active sludge treatment is performed by supplying a carbon source while adjusting pH of the nitrate waste liquid, and at a time of separating a denitrified liquid treated with the active sludge by using a first solid-liquid separating unit into a sludge-containing solid content and a denitrification-treated liquid, gas not containing oxygen is supplied thereby to accelerate a process for reducing an anaerobic microorganism and cleanse the active sludge adhered to the solid-liquid separating unit with the gas; and in a reaeration tank that aerates and mixes the denitrification-treated liquid treated in the denitrification tank with the active sludge, a step of further separating the denitrification-treated liquid treated with the active sludge into a sludge-containing solid content and a reaeration-treated liquid by using a second solid-liquid separating unit.

* * * * *